United States Patent Office 3,201,221
Patented Aug. 17, 1965

3,201,221
PROCESS FOR THE PRODUCTION OF PHOSPHATE FERTILIZER
Clarence J. Woerther, Fair Oaks, Calif., and James G. Gilchrist, Jr., Bartow, Fla., assignors to International Minerals & Chemical Corporation, a corporation of New York
No Drawing. Filed Oct. 5, 1962, Ser. No. 228,763
7 Claims. (Cl. 71—11)

This invention generally relates to the production of phosphate fertilizers. In a particular aspect it relates to a new process for the production of triple superphosphate. In another aspect it relates to a process for the production of phosphate fertilizers which contain at least fifty percent available phosphoric acid.

The commercial manufacture of fertilizers from phosphate rock, until recent years, has essentially contemplated only ordinary and triple superphosphate. Ordinary superphosphate is manufactured by reacting phosphate rock with sulfuric acid. Triple superphosphate, sometimes referred to as "treble" or "double" superphosphate is the article of commerce used largely as a fertilizer. It is made by treating ground phosphate rock with phosphoric acid, or with a mixture of phosphoric acid and sulfuric acids. It is composed predominantly of monocalcium phosphate, $Ca(H_2PO_4)_2$, with small amounts of gypsum and fluorine compounds.

In recent years, the consumers of fertilizers have urged the production of phosphate fertilizers of higher analysis than conventional triple superphosphate. The Tennessee Valley Authority sought to meet such demands by the development of a highly concentrated, so-called "super phosphoric acid," containing about seventy to seventy-five percent phosphorus pentoxide. Acidulation of phosphate rock with super phosphoric acid yields a fertilizer product containing an average of at least about fifty-four percent available phosphoric acid and characterized by acceptable proportions of water-soluble phosphorus pentoxide and citrate insoluble material. The production of super phosphoric acid is, however, beset by economic and other problems which have induced the fertilizer industry to seek an alternative route to the production of high analysis phosphate fertilizers.

It is, accordingly, an object of this invention to provide a new method for the production of triple superphosphate fertilizers.

It is another object of the present invention to provide a process for the production from phosphate rock and conventional wet process phosphoric acid of a phosphate fertilizer analyzing at least about fifty-four percent by weight available phosphoric acid determined as $P_2O_5$.

It is an additional object of the invention to provide a method for the production of high analysis phosphate fertilizers which does not entail utilization of super phosphoric acid.

These and other objects and advantages of this invention will be apparent from the description of the invention.

Generally described, the present invention is a process for the production of a phosphate fertilizer which comprises treating phosphate rock with a normally liquid hydrocarbonaceous material and subsequently treating the phosphate rock while still containing the normally liquid hydrocarbonaceous material with phosphoric acid. As used in the specification and claims the term available phosphoric acid is the sum of the water-soluble and the citrate-soluble phosphoric acid. The phosphoric acid content of fertilizers is expressed as weight percent phosphorus pentoxide ($P_2O_5$). The citrate-soluble phosphoric acid is that part of the total phosphoric acid in a fertilizer that is insoluble in water but soluble in a solution of citrate of ammonia according to the method adopted by the Association of Official Agricultural Chemists (A.O.A.C.).

The invention generically contemplates all of the various phosphate rocks from which conventional triple superphosphate may be derived. Reference is made to the treatise by Waggaman entitled, "Phosphoric Acid, Phosphates and Phosphatic Fertilizers," 2nd Ed., 1952, for a disclosure of a representative group of phosphate rocks. Representative phosphate rocks include Florida pebble phosphate, Tennessee phosphates, phosphates from the Western States of the United States, Senegalese phosphates, Israeli phosphates and the like. Florida phosphate is preferred. The rock is preferably comminuted to about −35 mesh prior to utilization in the invention. More preferably at least 80% of the comminuted rock is −100 mesh prior to utilization in the invention. The rock is of any suitable BPL content, preferably of at least 60% BPL and more preferably rock of at least 70% BPL content is used in the invention. The term "bone phosphate of lime" commonly abbreviated to BPL, is generally used to express the phosphate content of fertilizers. This is the equivalent of $Ca_3(PO_4)_2$. In the analysis of phosphate rock, the chemist generally reports the phosphorus content in terms of phosphorus pentoxide ($P_2O_5$).

Prior to acidulation, the comminuted phosphate rock is treated with a normally liquid hydrocarbonaceous material. Any suitable normally liquid hydrocarbonaceous material may be used. Vegetable and mineral oils may be used. Petroleum hydrocarbons such as crude oils, kerosene, gasoline, gas-oils, lubricating oil stocks, paraffin and wax distillates, etc. are preferred for use in the invention. The liquid is employed in amounts of at least 2 pounds of liquid per ton of solids treated and more preferably at least 5 pounds of liquid per ton of solids is employed. In general, less than about 100 pounds of the liquid per ton of phosphate rock is used.

Mixing of the normally liquid hydrocarbonaceous material with the comminuted phosphate rock may be effected in any suitable manner which will provide a substantially even distribution of the liquid throughout the comminuted phosphate rock. The normally liquid hydrocarbonaceous material is applied to the phosphatic material to coat at least a substantial portion, preferably all, of the surface of the comminuted phosphate particles. Commercial spray apparatus, including paint spray apparatus, advantageously can be employed. A thin layer of phosphate on a moving belt can be contacted with a liquid spray to achieve the coating. It will be apparent that other means also can be employed to provide the coating. No subsequent heat treatment or the like, prior to acidulation, is required or desirable.

After the comminuted phosphate rock is treated with the normally liquid hydrocarbonaceous material, it is treated with phosphoric acid preferably containing at least fifty percent by weight $P_2O_5$. The treatment of the phosphate rock, while still containing the normally liquid hydrocarbonaceous material, with the phosphoric acid may be conducted in any suitable manner. In general, methods and amounts of rock and acid used in the conventional preparation of triple superphosphate are contemplated. The phosphoric acid is used in suitable amount which generally is to provide a triple superphosphate product containing at least about 50% by weight total $P_2O_5$. Wet process phosphoric acid is eminently suitable for use. Furnace phosphoric acid and mixtures of furnace and wet process acid may also be used when desired.

The phosphoric acid used preferably contains at least about fifty percent, more preferably about fifty-two percent to about sixty percent by weight phosphorus pentoxide, and is employed in a concentration in an amount requisite to provide a composition containing at least about fifty percent, preferably fifty to about sixty percent by weight phosphorus pentoxide on a dry basis. Using phosphoric acid having a concentration within the range of 50–60% $P_2O_5$, and phosphate rock of about from 70–80% BPL content, the amount of phosphoric acid used is appropriately from about 100% to about 200% by weight of the phosphate rock acidulated, more specifically about 150% by weight.

When the phosphate rock contains at least a partial oil coating of a normally liquid hydrocarbonaceous material in accordance with this invention, it appears that the reaction of the rock with the acid is affected, and thus the physical properties of the triple superphosphate are enhanced. The product has the advantage of a higher bulk density as compared to triple superphosphate produced in the absence of a normally liquid hydrocarbonaceous material. The foregoing theory is offered in the interest of completeness and is not limiting or definitive of this aspect of the invention.

The admixture of coated phosphate rock and phosphoric acid is generally cured or aged, as is conventional in the production of triple superphosphate. In a further embodiment of the present invention the admixture of rock and acid after curing is heated to a temperature in the range from about 150° C. to about 300° C. to produce a substantially anhydrous calcination product containing at least about fifty-four percent, preferably about fifty-seven to about sixty-five percent by weight phosphorus pentoxide. The temperature observed in the triple superphosphate calcination will vary, within the limits of about 150° C. to about 300° C., with the quantity of phosphorus pentoxide in the calciner feed and is adjusted to produce a calcination product containing at least about fifty-four percent by weight phosphorus pentoxide. The residence time in the calcination step is maintained to obtain desirable citrate and water solubility characteristics in the calcined product. The calcination period is suitably more than about five minutes and less than about four hours.

It is apparent that the formation of a calcination product analyzing at least fifty-four percent by weight phosphoric pentoxide requires substantially complete conversion of the orthophosphates present in the starting material to a less hydrated form. However, the success of the calcination significantly depends upon control of the conditions to provide a calcination product containing amorphous calcium metaphosphate $Ca(PO_3)_2$, and calcium acid pyrophosphates but substantially free of crystalline calcium metaphosphates.

The amorphous calcium metaphosphate present in the calcination product is to be distinguished from the various crystalline calcium metaphosphates which are formed by calcination of calcium pyrophosphates at temperatures in excess of 300° C.

The formation of calcination products of suitable composition is in part achieved by observation of the upper calcination limit of 300° C. The formation of pyrophosphates may also effectively be minimized by conducting the calcination in an atmosphere of steam. For example, steam may be injected into the calciner. Alternatively, a direct-fired rotary kiln or comparable apparatus may be utilized, in which steam is introduced concurrently with the combustion gases.

The calcined product is appropriately cooled and recovered as a product of the process. In some events the calcium product may be comminuted to produce a more finely divided product.

In order to give a fuller understanding of the invention, but with no intention to be limited thereto, the following specific examples are given.

EXAMPLE I

Two 200 gram portions of 77% BPL comminuted phosphate rock were used in this example. The phosphate rock was −35 mesh and 80% −100 mesh. In Test 1, one of the 200 gram portions was mulled with 30 grams of kerosene to effect even distribution of the kerosene over the surface of the rock particles. The mixture of rock and kerosene was then acidulated with 310 grams of 54% $P_2O_5$ wet process phosphoric acid. The acidulated product was porous and friable. The triple superphosphate was placed in a 65° C. oven for curing for two weeks. In Test 2 the other 200 gram portion of phosphate rock was treated in substantially the same manner except no kerosense was added to the phosphate rock.

The triple superphosphate prepared in Test 1 had the following analysis:

*Test 1*

| Total $P_2O_5$ | Percent Citrate Insoluble $P_2O_5$ | Percent Water Soluble $P_2O_5$ | Percent Available Phosphoric Acid |
|---|---|---|---|
| 51.8 | 0.6 | 49.0 | 51.2 |

The −60 +140 mesh fraction of the cured triple superphosphate product of Test 1 had a bulk density of 66.5 lbs./ft.$^3$. The same fraction of cured triple superphosphate of Test 2, however, had a bulk density of only 62 lbs./ft.$^3$.

This example illustrates that a dense triple superphosphate product is produced when following the process of the present invention.

EXAMPLE II

The cured triple superphosphate product produced in Test 1 was calcined for 2 hours at 225° C. (Test 3). The cured triple superphosphate of Test 2 was also calcined for 2 hours at 225° C. (Test 4). The results of these tests were as follows:

| Test | Percent Total $P_2O_5$ | Percent Citrate Insoluble $P_2O_5$ | Percent Water Soluble $P_2O_5$ | Percent Available Phosphoric Acid |
|---|---|---|---|---|
| 3 | 63.4 | 1.3 | 9.6 | 62.1 |
| 4 | 61.1 | 3 | 9.8 | 57.4 |

The bulk densities of products 3 and 4 were substantially the same, specifically 60 lb./cubic foot.

The total $P_2O_5$ of the products differed. The product of Test 3 had 2.3% more total $P_2O_5$. A significant item to note is that the product of Test 3 had only 1.3% citrate insoluble $P_2O_5$ while that of Test 4 had 3.7% citrate insoluble $P_2O_5$. The product of Test 3 therefore contained 62.1% available phosphoric acid while the product of Test 4 contained only 57.4% available phosphoric acid.

These tests (3 and 4), therefore, illustrate that a product of higher APA (available phosphoric acid) content may be prepared when the acidulation of the phosphate rock is effected after the rock is treated with a normally liquid hydrocarbonaceous material.

The description of the invention utilized specific reference to certain process details; however, it is to be understood that such details are illustrative only and not by way of limitation. Other modifications and equivalents of the invention will be apparent to those skilled in the art from the foregoing description.

Having now fully described and illustrated the invention, what is desired to be secured and claimed by Letters Patent is set forth in the appended claims.

We claim:

1. A process for the production of a phosphate fertilizer containing at least about fifty percent by weight available phosphoric acid, determined as $P_2O_5$, which comprises treating comminuted phosphate rock of at least 70% BPL with a normally liquid petroleum hydrocarbon in an amount of at least 2 lbs. per ton of rock, subsequently reacting the phosphate rock while still containing the normally liquid hydrocarbon with phosphoric acid containing at least 50% by weight $P_2O_5$, and recovering a product containing at least about 50% by weight available phosphoric acid, determined as $P_2O_5$.

2. The process of claim 1 wherein said normally liquid hydrocarbon comprises kerosene.

3. The process of claim 1 wherein said phosphoric acid is wet process phosphoric acid.

4. The process of claim 1 wherein said normally liquid hydrocarbon is used in an amount of at least 5 lbs. per ton of phosphate rock.

5. A process for the production of a high analysis phosphate fertilizer containing at least about fifty-four percent by weight available phosphoric acid, determined as $P_2O_5$, which comprises treating comminuted phosphate rock particles of at least 70% BPL with a normally liquid petroleum hydrocarbon in an amount of at least 2 lbs. per ton of rock to coat at least a substantial portion of the surface of the particles, reacting the phosphate rock particles while still containing the normally liquid hydrocarbon with phosphoric acid containing at least 50% by weight $P_2O_5$, and calcining the reaction mixture at a temperature of from about 150° C. to about 300° C. for a time period of from about 5 minutes to about 4 hours to produce a substantially anhydrous calcination product substantially free of crystalline calcium metaphosphates and containing at least about 54% available phosphoric acid.

6. The process of claim 5 wherein said normally liquid hydrocarbon comprises kerosene.

7. The process of claim 5 wherein said normally liquid hydrocarbon is used in an amount of at least 5 lbs. per ton of phosphate rock.

References Cited by the Examiner

UNITED STATES PATENTS

| | | | |
|---|---|---|---|
| 1,880,491 | 10/32 | Rothe et al. | 71—45 |
| 2,418,203 | 4/47 | Stauffer | 71—40 |
| 2,786,746 | 3/57 | Goldhaar | 71—41 |
| 2,844,455 | 7/58 | Harris | 71—40 |
| 2,875,032 | 2/59 | Bursaux et al. | 71—44 |
| 3,078,156 | 2/63 | Yamaguchi | 71—44 |

DONALL H. SYLVESTER, *Primary Examiner.*

ANTHONY SCIAMANNA, *Examiner.*